(12) United States Patent
Roberts et al.

(10) Patent No.: US 8,772,014 B2
(45) Date of Patent: Jul. 8, 2014

(54) METHOD FOR STABILIZATION OF BIOLOGICAL CULTURES TO ALLOW BIOLOGICAL TREATMENT OF BRINES

(75) Inventors: Deborah J. Roberts, League City, TX (US); Dennis A. Clifford, Houston, TX (US); Xiaohua Lin, Houston, TX (US); Thomas Gillogly, Las Vegas, NV (US); Lee Aldridge, Haiku, HI (US); Stewart Lehman, Sierra Madre, CA (US)

(73) Assignee: The University of Houston System, Houston, TX (US)

( * ) Notice: Subject to any disclaimer, the term of this patent is extended or adjusted under 35 U.S.C. 154(b) by 2109 days.

(21) Appl. No.: 10/579,640

(22) PCT Filed: Nov. 19, 2004

(86) PCT No.: PCT/US2004/038808
§ 371 (c)(1),
(2), (4) Date: Mar. 5, 2007

(87) PCT Pub. No.: WO2005/061397
PCT Pub. Date: Jul. 7, 2005

(65) Prior Publication Data
US 2007/0275450 A1   Nov. 29, 2007

Related U.S. Application Data

(60) Provisional application No. 60/523,637, filed on Nov. 20, 2003.

(51) Int. Cl.
| | | |
|---|---|---|
| *A62D 3/10* | (2007.01) | |
| *A62D 3/02* | (2007.01) | |
| *C12Q 1/02* | (2006.01) | |
| *C12N 1/04* | (2006.01) | |
| *C12N 1/20* | (2006.01) | |
| *C12N 9/00* | (2006.01) | |
| *C12N 1/38* | (2006.01) | |

(52) U.S. Cl.
USPC ........... 435/262.5; 435/29; 435/183; 435/243

(58) Field of Classification Search
USPC ................................. 435/29, 183, 243, 262.5
See application file for complete search history.

(56) References Cited

U.S. PATENT DOCUMENTS

| | | | | |
|---|---|---|---|---|
| 6,066,257 A | * | 5/2000 | Venkatesh et al. ............ | 210/615 |
| 6,077,429 A | * | 6/2000 | Frankenberger et al. ...... | 210/605 |
| 6,214,607 B1 | * | 4/2001 | Logan ........................ | 435/262.5 |

OTHER PUBLICATIONS

Okeke et al., 2002. Reduction of perchlorate and nitrate by salt tolerant bacteria. Environmental Pollution, vol. 118, pp. 357-363.*
Anderson et al., Measuring the Salinity of Water, Note No. LC0064, Department of Primary Industries|Agriculture, State Government of Victoria, Published 1999, pp. 1-4.*
Daiz Maria Peidad et al., "Isolation and Characterization of Novel Hydrocarbon-degrading Euryhaline Consortia from Crude Oil and Mangrove Sediments," Marine Biotechnology (New York), vol. 2, No. 6, Nov. 2000, pp. 522-532.
Xu Jianlin et al, "Microbial Degradation of Perchlorate: Principles and Applications," Environmental Engineering Science, vol. 20, No. 5, Sep. 2003, pp. 405-422.
Okeke Benedict C et al, "Reduction of perchlorate and nitrate by salt tolerant bacteria," Environmental Pollution, vol. 118, No. 3, 2002, pp. 357-363.
PCT ISR, PCT/US2004/038808, Apr. 7, 2005.
Va Alva and BM Peyton, "Phenol and Catechol Biodegradation by the Haloalkaliphile Halomonas campisalis: Influence of pH and Salinity,", Environ. Sci. Technol. 2003,37,4397-4402.
Hubert Attaway and Mark Smith, "Reduction of perchlorate by an anaerobic enrichment culture," Journal of Industrial Microbiology, 12 (1993) 408-412.
Royce A. Bruce, Laurie A. Achenbach and John D. Coates, "Reduction of (per)chlorate by a novel organism isolated from paper mill waste,", Environmental Microbiology (1999) 1(4), 319-329.
Y. Cang, D.J. Roberts*, D.A. Clifford, "Development of cultures capable of reducing perchlorate and nitrate in high salt solutions," Water Research 38 (2004) 3322-3330.
Dennis Clifford and Xiasoha Liu, "Biological Denitrification of Spent Regenerant Brine Using a Sequencing Batch Reactor," War. Re$. vol. 27, No. 9, pp. 1477-1484, 1993.
Tina M. Gingras and Jacimaria R. Batista, "Biological reduction of perchlorate in ion exchange regenerant solutions containing high salinity and ammonium levels," J. Environ. Monit., 2002, 4, 96-101.
David C. Herman and William T. Frankenberger, Jr., "Bioremediation and Biodegradation," J. Environ. Qual. 28:1018-1024 (1999).
Serve' W. M. Kengen, Geoffrey B. Rikken, Wilfred R. Hagen, Cees G. Van Ginkel, and Alfons J. M. Stams, "Purification and Characterization of (Per)Chlorate Reductase from the Chlorate-Respiring Strain GR-1," Journal of Bacteriology, Nov. 1999, p. 6706-6711.
Bruce E. Logan, Jun Wu and Richard F. Unz, Biological Perchlorate Reduction in High-Salinity Solutions, Water Res. vol. 35, No. 12, pp. 3034-3038, 2001.
Bruce E. Logan, Husen Zhang, Peter Mulvaney, Michael G. Milner, Ian M. Head, and Richard F. Unz, "Kinetics of Perchlorate- and Chlorate-Respiring Bacteria," Applied and Environmental Microbiology, Jun. 2001, p. 2499-2506.
Benedict C. Okeke, Tara Giblin, William T. Frankenberger Jr., Reduction of perchlorate and nitrate by salt tolerant bacteria, Environmental Pollution 118 (2002) 357-363.
G. B. Rikken á A. G. M. Kroon á C. G. van Ginkel, "Transformation of (per)chlorate into chloride by a newly isolated bacterium: reduction and dismutation," Appl Microbiol Biotechnol (1996) 45:420-D426.
C. G. van Ginkel • G. B. Rikken • A. G. M. Kroon S. W. M. Kengen, "Purification and characterization of chlorite dismutase: a novel oxygen-generating enzyme," Arch Microbiol (1996) 166 : 321-326.

* cited by examiner

*Primary Examiner* — Jon P Weber
*Assistant Examiner* — Kailash C Srivastava
(74) *Attorney, Agent, or Firm* — Robert W Strozier

(57) ABSTRACT

A process is disclosed for the biological treatment under anaerobic/anoxic conditions for the degradation of pollutants present in brine solution used in waste water management, in industrial waste brine solutions and in waste oil field brine solutions, especially waste brine solutions contaminated with perchlorate and nitrate. A culture capable of reducing perchlorate and nitrate in spent ion-exchange regenerant brine containing at least 30 g/L NaCl under anaerobic/anoxic conditions was used to demonstrate the process. A stabilized brine solution is also disclosed in which a culture capable of degrading a given pollutant can be proliferate.

17 Claims, 3 Drawing Sheets

METHOD FOR STABILIZATION OF BIOLOGICAL CULTURES TO ALLOW BIOLOGICAL TREATMENT OF BRINES

RELATED APPLICATIONS

This application claims priority to PCT Patent Application Serial No. PCT/US04/38808, filed 19 Nov. 2004, which claims priority to U.S. Provisional Patent Application Ser. No. 60/523,637, filed 20 Nov. 2003, incorporated herein by reference.

GOVERNMENT SPONSORSHIP

This invention was made in part with government support under Account #2805 awarded by the MWH/AWWARF. This invention was also made in part from the University of Houston under the grant number 1551320 (cost Center #00730-5022-H0068-B0001-G086414.

BACKGROUND OF THE INVENTION

1. Field of the Invention

The present invention relates to a composition for stabilizing biological cultures in brine solutions under anaerobic/anoxic conditions and to a process for treating brine solutions biologically under anaerobic/anoxic conditions, where the cultures include one or a plurality of microorganisms capable degrading a desired pollutant in a brine solution.

More particularly, the present invention relates to a composition for stabilizing a biological culture in a brine solution under anaerobic/anoxic conditions, where the composition includes an effective amount of a divalent cation, where the effective amount of the divalent cation is sufficient to produce a divalent/monovalent cation ratio in the brine solution of at least a 0.05 mole/mole or a divalent/monovalent cation ratio greater than or equal to 0.05 mole/mole, where the ratio promotes growth and sustained proliferation of biological microorganisms capable of degrading pollutants or decreasing a concentration of pollutants in the brine solution. The present invention relates to a method using the composition to treat contaminated brine solutions under anaerobic/anoxic conditions. In one preferred embodiment, the stabilized brine solutions are geared to stably grow perchlorate degrading microorganism. In another preferred embodiment, the stabilized brine solutions are geared to stably grow perchlorate and nitrate degrading microorganisms.

2. Description of the Related Art

Many industrial wastes stream are composed of aqueous salt solutions such as ion-exchange brines, oilfield production brines, spent caustic solution, and brines produced during chemical processes that contain elevated levels or concentrations of salts such as $Na^+$. These waste stream may also contain contaminants that would be amenable to biological treatment, microbial treatment, if organisms or microbes could function in high salt waste streams. Some have noted that there is an increasing need for a biological treatment adapted to saline and alkaline environments in industrial wastewater management and that traditional pollutant biodegradation is less efficient or does not function when a salinity of the stream or solution increases above the salinity of seawater.

Alva and Peyton (2003) examined biological culture growth and phenol degradation at different salt concentrations, but they did not increase the concentration of divalent cations when they increased the $Na^+$ concentration. Thus, the divalent to monovalent ratio decreased during the study.

Logan et al. (2001b) screened six sources of inoculum collected from different saltwater environments for perchlorate reduction. After three months incubation, growth was observed in media containing perchlorate and 3% NaCl with inocula from only three sources (seawater, saline lake water and biofilm/sludge). Two of these three (seawater and saline lake water) grew through 3% to 7% salinity in subsequent transfers. They make no mention of increasing the divalent cation concentrations when they increased the $Na^+$ concentrations in their tests.

In U.S. Pat. No. 6,077,432 a method for the treatment of wastewater, suspected of being contaminated with perchlorates, nitrates, hydrolysates and other energetic materials is disclosed. The method comprises (a) providing at least one microaerobic reactor containing a mixed bacterial culture capable of reducing perchlorate, nitrate, hydrolysates and other energetic products; (b) feeding contaminated wastewater into the microaerobic reactor; (c) maintaining a microaerobic environment in the microaerobic reactor by at least one method selected from the group consisting of (i) mixing air and nitrogen gas and sparging or purging the reactor with the gas mixture; (ii) using a nitrogen membrane separator to provide a low oxygen-containing nitrogen gas to the reactor for sparging or purging; (iii) adding air to the reactor for sparging or purging as necessary to maintain a target dissolved oxygen concentration or a target oxygen concentration in head space gas present in the reactor; and (iv) adding and/or maintaining oxygenated ions and/or oxygenated molecules; and (d) maintaining suitable nutrient and environmental conditions in the microaerobic reactor so as to cause decontamination of the contaminated wastewater.

Okeke et al. (2002) obtained cultures that could reduce both perchlorate and nitrate in 0 to 5% NaCl environments, but no effort was made to adjust the divalent cation to monovalent cation ratio.

Clifford and Liu (1993) developed a sequencing-batch-reactor (SBR) denitrification process to treat and reuse nitrate brine containing 3% NaCl. A pilot study using this ion-exchange process with batch biological denitrification and reuse of the spent brine was conducted successfully in McFarland, Calif. in 1994 where spent brine was denitrified and reused 38 times. (Liu and Clifford, 1996). Compared with a conventional ion-exchange process, brine denitrification and reuse reduced the salt consumption by 50 percent and waste discharge by more than 90 percent.

Microbial perchlorate reduction under anaerobic conditions has been studied by many researchers. See for example Attaway and Smith, 1993; Herman and Frankenberger, 1999; Logan et al., 2001a; Rikken et al., 1996. Many microorganisms can reduce perchlorate to harmless chloride. Unfortunately, most known perchlorate-reducing microorganisms cannot endure high salinity in the growth media, and usually require less than 2% to 3% NaCl. See for example Coates et al. (2000), Malmqvist et al. (1994), and Michaelidou et al. (2000).

Several other researchers have conducted salt tolerance tests for the growth of many organisms, but none that changed the divalent cation concentration when the sodium concentration was changed.

Thus, there is a need in the art for a brine solution capable of stable microbial growth under anaerobic/anoxic conditions and a method to stabilize biological treatment systems in high saline or brine solutions under anaerobic/anoxic conditions.

SUMMARY OF THE INVENTION

The present invention provides a composition including a brine solution including a pollutant, where the brine solution has an effective divalent to monovalent cation mole ratio and where the effective ratio is sufficient to promote stable microbial proliferation in a brine solution under anaerobic/anoxic conditions, where the microbes are capable of degrading the pollutant under anaerobic/anoxic conditions. Preferred cultures are cultures that are capable of degrading perchlorate and/or nitrate in stabilized brine solutions of this invention.

The present invention also provides a brine solution including a pollutant and an effective amount of a divalent ratio, where the effective amount is sufficient to adjust a divalent to monovalent cation mole ratio into a range capable of supporting stable microorganism growth and proliferation under anaerobic/anoxic conditions, where the microorganism or microorganisms are capable of reducing a concentration of the pollutant in the brine solution to a desired level, preferably a level below a set governmental standard or below a detection limit for a governmentally accepted analytical technique. Using the composition of this invention, perchlorates, nitrates, hydrolysates and other energetics can be reduced to a desired low level and preferably below non-detectable concentrations, in a safe and cost effective manner, using readily available non-toxic low cost nutrients. The treatment of this invention results in the degradation of a significantly higher concentrations of perchlorate, nitrate, etc. (<1.5 wt %) than was previously possible, especially in brine solution having a salinity greater than 3%. In one preferred embodiment, the salinity ranges from about 3% to about 18%. In another preferred embodiment, the salinity ranges from about 3% to about 15%. In another preferred embodiment, the salinity ranges from about 3% to about 12%. In another preferred embodiment, the salinity ranges from about 3% to about 10%.

The present invention also provides a brine solution including a pollutant and having an effective divalent to monovalent cation ratio, where the effective ratio is sufficient to stabilize a biological treatment system including at least one microorganism, where the at least one microorganism is capable of reducing a concentration of the pollutant in the brine solution under anaerobic/anoxic conditions, degrading the pollutant in the brine solution or eliminating the pollutant in the brine solution and where a rate of pollutant reduction is similar to (within ±10%) of a rate of pollutant reduction of an equivalently polluted freshwater solution.

The present invention provides a method including the step of adding an effective amount of a soluble divalent metal complex to a brine solution to form an biologically compatible brine solution, where the effective amount of the complex is sufficient to adjust a divalent to monovalent cation mole ratio to a numeric value greater than or equal to about 0.05 and where the biologically compatible brine solution is capable of supporting and sustaining microbes or microorganisms having pollutant reduction or degradation properties under anaerobic/anoxic conditions.

The present invention provides a method including the steps of analyzing a brine solution to determine a divalent to monovalent cation mole ratio and adding an effective amount of a soluble divalent metal complex to the brine solution, where the effective amount of the soluble divalent metal complex is sufficient to form an biologically compatible brine solution, where the effective amount of the complex is sufficient to adjust a divalent to monovalent cation mole ratio to a numeric value greater than or equal to about 0.05 and where the biologically compatible brine solution is capable of supporting and sustaining microbes or microorganisms having pollutant reduction or degradation properties under anaerobic/anoxic conditions. By the method of the present invention, perchlorates, nitrates, hydrolysates and other energetics can be reduced to non-detectable concentrations, in a safe and cost effective manner, using readily available non-toxic low cost nutrients. The method can also be used to degrade other brine solution pollutants by a judicious choice of microbes capable of degrading a given pollutant.

DEFINITIONS

The term brine solution means any aqueous solution having dissolved therein a sufficient amount of a monovalent alkali metal salt to have a salinity of 3% or more.

The term microbe means a microorganism capable of degrading a particular pollutant in a stabilized brine solution of this invention, where the exact microorganism will depend on the pollutant to be degraded.

The term microorganism means a one celled or multicelled living organism capable of degrading a particular pollutant in a stabilized brine solution of this invention, where the exact microorganism will depend on the pollutant to be degraded.

Under anaerobic/anoxic conditions mean conditions in which no oxygen or substantially no oxygen is present, by substantially, we mean less than about 500 ppm. As it relates to brine solutions, under anaerobic/anoxic conditions means that the brine solution has no or minimal amount of dissovled oxygen in the solution during the microbial treating step.

DESCRIPTION OF THE DRAWINGS

The invention can be better understood with reference to the following detailed description together with the appended illustrative drawings in which like elements are numbered the same.

DETAILED DESCRIPTION OF THE INVENTION

Figure 1:
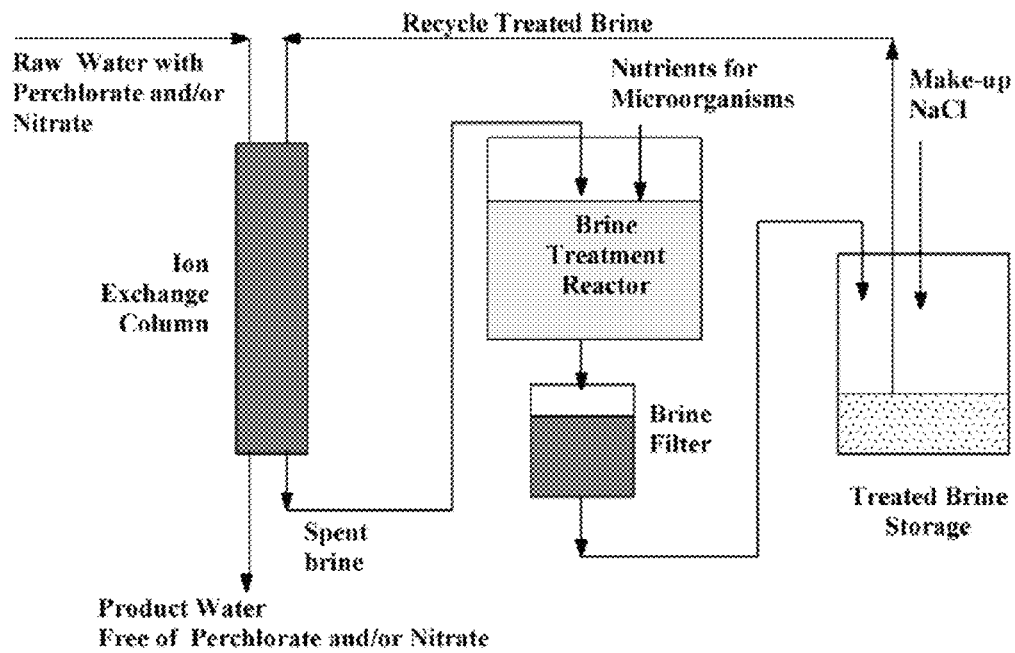
FIG. 1 depicts a simple schematic of a preferred apparatus of this invention for combined ion-exchange and biological treatment.

The inventors have found that a novel composition and method to stabilize biological treatment systems in high saline solution or brine solutions having a high salinity can be constructed where the composition and method permit the sustained growth of microorganisms or microbes capable of reducing pollutant levels in brine solutions under anaerobic/ anoxic conditions. The inventors have found that the composition and method are ideally suited for reducing perchlorate ion concentration in ion-exchange brine solutions, again under anaerobic/anoxic conditions. The inventors have also found that through the addition of an effective amount of a divalent cation such as $Mg^{2+}$ or $Ca^{2+}$ to a pollutant contaminated brine solution, microorganisms are capable of growing that degrade pollutants as rapidly and as stably as if the microorganisms were being grown in an equivalently polluted freshwater solution. The inventors are currently unaware of any other process for increasing the salt tolerance of microbial cultures.

The present invention relates broadly to a brine solution capable of supporting microbial growth under anaerobic/anoxic conditions, where the brine solution has a divalent to monovalent cation mole ratio greater then or equal to 0.05, preferably greater than or equal to 0.1. One preferred embodiment includes a NaCl brine solution having added thereto a sufficient amount of a divalent metal ion, $M^{2+}$ ion, to attain the desired molar ratio. Generally, the divalent to monovalent cation mole ratio is adjusted by adding between about 100 mg/L $M^{2+}$ ions and about 4000 mg/L $M^{2+}$ ions, preferably, between about 500 mg/L $M^{2+}$ ions and about 3000 mg/L $M^{2+}$ ions, particularly, between about 750 mg/L $M^{2+}$ ions and about 2000 mg/L $M^{2+}$ ions, and an optimal level between about 1000 mg/L $M^{2+}$ ions and about 2000 mg/L $M^{2+}$ ions to the solution. Of course, the exact amount of divalent ion to add depends on the initial ratio of the brine solution. For perchlorate ion degradation, the $M^{2+}$ ion is selected from the group consisting of $Mg^{2+}$, $Ca^{2+}$, $Sr^{2+}$ and mixtures or combinations thereof, where $Mg^{2+}$ is preferred for use in perchlorate contaminated brine solution having high carbonate concentration or in which carbonates are formed. For other pollutants, the $M^{2+}$ ion is selected from the group consisting of $Mg^{2+}$, $Ca^{2+}$, $Sr^{2+}$, $Ba^{2+}$, and mixtures or combinations thereof.

The present invention relates broadly to a method for biologically treating a pollutant contaminated brine solution including the steps of adding an effective amount of a divalent ion source to a brine solution, where the effective amount is sufficient to produce a biologically compatible brine solution capable of supporting and sustaining microbial growth or a biologically stable brine solution. Once the brine solution has been stabilized, a biologically effective amount of a microbial population can be introduced into the solution under anaerobic/anoxic conditions, where the biologically effective amount of the microbial population is sufficient to improve a reduction of pollutant concentrations in the brine solution compared to brine solution in the absence the effective amount of a divalent cation source. In fact, in the presence of the divalent metal cation, the pollutant degradation propensity of the microbials are similar to the pollutant degradation propensity of the microbials in fresh water.

The present invention relates broadly to a method including the steps of passing a waste water stream through an ion-exchange resin column including an ion-exchange resin capable of extracting perchlorate and/or nitrate ions. After the ion-exchange resin fully loaded with perchlorate an/or nitrate ions or after a sufficient extraction time, the flow of the waste water stream is stopped and a stabilized brine solution of this invention having a divalent to monovalent cation mole ratio of at least 0.05 is passed through the ion-exchange resin to produce a contaminated brine solution, where the stabilized brine solution is capable of supporting and sustaining microbial growth. To the contaminated brine solution is then added a pollutant degrading effective amount of a microbial composition including one microorganism or a plurality of microorganisms each capable of degrading the perchlorate and/or nitrate ions in the stabilized brine solution to form a microbially active brine solution. The microbially active brine solution is agitated under anaerobic/anoxic conditions for at a temperature and for a time sufficient to degrade the perchlorate and/or nitrate concentrations below a desired concentration. After microbial treatment, the microbially active brine solution is filtered to remove the microbial composition. After microbial composition removal, a makeup amount of NaCl is added to the stabilized brine solution where the additional NaCl is sufficient to adjust the salinity of the stabilized brine solution. Optionally, an additional amount of the divalent ion source can be added to the filtered stabilized brine solution, where the amount of additional divalent ion source is sufficient to maintain the ratio of at least 0.05. The stabilized brine solution can then be reused in the perchlorate extraction process. In an analogous fashion, the present method can be adapted for use in treating any type of pollutant contaminated brine solution using a stabilized brine solution of this invention.

Unlike prior art aerobic systems that require large amount of specialized nutrients, the present invention operates in the absence of oxygen, i.e., under anaerobic/anoxic conditions, is based on adjusting the divalent to monovalent cation mole ratio of the brine solutions to promote microbial growth and proliferation and requires only the addition of acetate as a nutrient so that the degrading brine solutions of this invention are simpler, easier to maintain and more stable the prior art brine solutions used to degrade pollutants.

Suitable Material for Use in the Present Invention

Suitable divalent ion source for use in this invention includes, without limitation, any soluble divalent metal salt, where the counterion does not adversely after the culture. Exemplary examples of the divalent metal salts include, without limitation, divalent metal chlorides, divalent metal bromides, or mixtures or combinations thereof. The preferred salts are chloride salts.

suitable divalent ion for use in this invention include, without limitation, magnesium, calcium, strontium, other similar divalent metal cations capable of promoting microbial growth in brine solutions or mixtures or combinations thereof.

Suitable microbials or microorganisms for use in this invention include, without limitation, bacteria from capable of growing in the stabilized brine solutions of this invention and capable of degrading the pollutant of interest.

suitable pollutants which can be degraded using the compositions and methods of this invention include, without limitation, inorganic pollutants, organic pollutants, or mixtures or combinations thereof. Exemplary inorganic pollutants include, without limitation, perchlorates, nitrates, nitrites, or mixture or combinations thereof. Exemplary organic pollutants include, without limitation, phenols, PCBs, chlorinated solvents, solvents, sewage, industrial wastes, oils, sludge, other chemical pollutants or mixtures or combination thereof.

Suitable solid medium for supporting microbial growth include, without limitation, diatomaceous earth, activated carbon, sand, ion-exchange resin, or mixtures or combinations thereof.

Suitable reactors for use in the treating step of this invention include, without limitation, a plug flow, dispersed plug flow, or continuously stirred tank reactor, or as a packed, expanded, or fluidized bed column.

Experimental Section

The examples below illustrate that adjusting a divalent/monovalent cation mole ratio in waste brine solutions results in an improved, reusable and safe disposal system or treatment system for treating polluted brine solutions, especially brine solutions including pollutants such as perchlorate and nitrate ions.

General Background of Perchlorate-Contaminated Brine Solutions

Perchlorate ($ClO_4$) is a contaminant found in groundwater that can be removed by an ion-exchange process using an ion-exchange resin. During the process, the resins are regenerated resulting in the formation of brine solutions contaminated with perchlorate. These brine solutions are largely defined by a concentration of NaCl in the brine solution used to regenerate the resin. Typically, the NaCl concentration ranges from as low as about 30 g/L NaCl (a 3% saline solution or a 0.5 M NaCl solution) to as high as about 90 g/L (a 9% saline solution or a 1.5 M NaCl solution). These brine solutions represent waste streams requiring disposal. Generally, the higher the NaCl concentration of the regenerant brine solution, the smaller a volume of the perchlorate-contaminated brine solution generated. These brine solutions can also contain nitrates.

Although these brine solutions can now be disposed of directly into the environment, the EPA is planning to enact legislation that will forbid the disposal of perchlorate-contaminated brine solutions directly into the environment. The ability to remove nitrate and perchlorate from such brine solutions will allow brine solution disposal, and more importantly, will allow the treated brine solutions to be continually recycled in an ion-exchange process. The ability to recycle the treated brine solution will result in a conservation of salt and decrease disposal costs.

Typical water treated in ion-exchange processes includes about 50 to about 100 µg/L perchlorate and between about 1 to about 20 mg/L nitrate-N. After treating, a brine solution is produced including between about 2.5 and about 10 mg/L perchlorate and between about 150 and about 500 mg/L nitrate-N. For more details on typical waste water stream the reader is direct to Tripp and Clifford, (2000) and Najm et. al. (1999).

Coppola (1999) Coppola et al. (2000) reported that HAP-1 or a strain of *Wolinella succinogenes* could reduce perchlorate in brine solution having 2% to 3% NaCl in the presence of high concentrations of nitrate, sulfate, ammonia and chlorate. The culture could not grow at higher salt concentrations and required strict maintenance of microaerophillic conditions and the addition of rich nutrients.

Okeke et al. (2002) obtained cultures that could reduce both perchlorate and nitrate in solutions having 0 to 5% NaCl. A *Citrobacter* isolate was reported to provide the fastest nitrate and perchlorate removal in conjunction with their Perclace™ culture, removing 46.4% of the perchlorate fed to it in one week. However, because typical ion-exchange columns treating perchlorate and nitrate will be exhausted in less than 24 hours, a culture should be able to remove nitrate and perchlorate in less than 24 hours to avoid having to store large volumes of brine for remediation.

Example

This examples illustrates the biological treatment of perchlorate and nitrate contaminated ion-exchange brines.

One preferred method of this invention includes the step of using an ion-exchange resin to remove perchlorate from a polluted water. Once the resin is no longer capable of removing perchlorate, the resin is regenerated using a brine solution to produce a perchlorate contaminated brine solution. To the perchlorated contaminated brine solution is added an effective amount of a divalent cation precursor sufficient to adjust a divalent to monovalent cation mole ratio in the perchlorate contaminated brine solution to a numeric value greater than or equal to about 0.05. After adjusting the ratio in the brine solution, a treating effective amount of a biological treating composition is added to the brine solution and the solution is agitated for a time and at a temperature sufficient to reduce the perchlorate and/or nitrate concentration to or below a desired low level. The biological treating composition includes at least one microorganism capable of degrading perchlorate ions to chloride ions.

Referring now to FIG. 1, a block diagram of a preferred embodiment of an apparatus for implementing a method of this invention, generally 100, is shown to include an ion-exchange column 102 filled an ion-exchange resin 104 and having a contaminated waste water input 106, a brine solution input 108, a treated water output 110 and a brine solution output 112. The waste water input 106 is connected to a source of waste water (not shown). Waste water containing ion-exchangeable contaminants including perchlorate and nitrate ions flows from the source through the waste water input 106 and passes through the ion-exchange column 102 and exchanges its ion contaminants to the resin 104 until the ion-exchange resin 104 is no longer capable of exchanging the contaminant ions or for a set period of time. After the specified time or after full exchange of the resin 104, the waste water input 106 is closed by a valve or other similar shut off device (not shown) and the brine solution input 108 is opened by a valve or other similar shut off device (not shown) is connected to a brine solution treatment reactor 114. The reactor 114 includes a brine solution input 115 a microbial nutrient input 116 connected to a microbial nutrient input source (not shown). The reactor 114 can also include a microbial input for adding microbes to the reactor 114 to maintain an effective concentration of viable microbes in the reactor 114. The reactor 114 also includes a crude treated brine solution output 118 connected to a filter tank 120 including a filter 122, where the microbes in the crude treated brine solution are removed by the filter 122. The filtered treated brine solution flows out of the filter tank 120 via a filtered, treated brine solution output 124 connected to a brine holding tank 126. The holding tank 126 includes a make up NaCl input 128 connected to a NaCl source (not shown). The holding tank 126 can also include a divalent cation precursor input connected to a source (not shown). In a batch mode, the process would run waster water through the resin column until the resin was exhausted.

The waster water feed would then be shut off and the column regenerated. The resulting brine solution is then treated by microbes to remove the pollutants in the brine. In a continuous mode, the process would include two or more resin columns. One column used to process the waste water while the other is being regenerated. A brine solution is continuously being treated to remove the ion exchanged contaminants, filtered, stored, adjusted with additional NaCl and divalent cation precursor, and recirculated to the regenerating column. In the continuous mode, not only is nutrients added to the treating reactor, but microbes are also added to maintain a treating level of microbes in the reactor. The entire process is sealed as much as possible to prevent air and the biological reactor is sparged with nitrogen gas to maintain anoxic/anaerobic conditions. The $M^{2+}$ is maintained at the optimal ratio to $Na^+$ for the best culture stability in the specific brine solutions by addition to the spent brine storage tank. Makeup sodium chloride is added in the sweet brine storage tank. Alterations to the proposed diagram include the use of continuous culture to replace the batch culture. A media filter immediately follows the biological treatment unit to prevent any organisms that did not settle in the reactor from coming in contact with the resin bed.

The initial attempts to develop a biological culture that could treat brine solutions having a high salt content from a sewage sludge inoculum were unsuccessful. Cultures were then obtained that could degrade perchlorate and/or nitrate, which are typical pollutants in waste water brine solutions, but these microbes could not be adapted to any more than 15 g/L NaCl. When marine sediments were used as an inoculum, the inventors were able to develop two cultures that could degrade perchlorate and nitrate in synthetic media containing 30 or 60 g/L NaCl. These cultures degraded perchlorate and nitrate simultaneously, and require the complete absence of oxygen from the headspace and the media. That is, the cultures, which includes a collection of microorganisms, some identified and some not yet identified, degrade these pollutants under strict anaerobic/anoxic conditions.

Culture Development

A culture developed from marine sediment that was capable of degrading perchlorate and/or nitrate in 30 g/L NaCl synthetic media in the first feedings of ion-exchange brine became unstable after removal of biomass to perform subsequent experiments. This culture did not maintain or increase biomass as most biological cultures do. The culture developed from marine sediment and raised in 60 g/L NaCl synthetic medium could not degrade perchlorate at all in a 60 g/L NaCl ion-exchange brine solution.

Materials and Methods for Microbe Selection

In this research, two approaches were taken to the development of cultures capable of reducing perchlorate and nitrate in solutions of 30 or 60 g/L NaCl. The first was to enrich a population of perchlorate- and/or nitrate-reducing organisms from sewage, and then acclimate these to increasing salt concentrations as was done by Clifford and Liu [7]. The second was to screen six marine sediments for their use as inoculum for developing salt-tolerant perchlorate-reducing cultures. Table 1 presents a summary of the experimental and culture conditions tested in this research.

Perchlorate- and Nitrate-Reducing Culture Development from Marine Inocula

Screening Tests in 3% and 6% NaCl

Six anaerobic near-shore marine sediments were sampled and shipped in well sealed white-plastic buckets. They were kept refrigerated (4° C.) and well sealed between uses.

TABLE 1

Summary of Experimental Conditions

| ID | Media description[a] | Inoculum | Variables | NaCl (mg/L) | Mode |
| --- | --- | --- | --- | --- | --- |
| I Sewage 1 | 1 | Sewage | Stepwise adaptation to NaCl | 8-20 g/L NaCl | Spike and SBR |
| I Sewage 2 | 2 | Sewage | Stepwise adaptation to NaCl | 8-20 g/L NaCl | Spike and SBR |
| I Sewage 3 | 3 | Sewage | Stepwise adaptation to NaCl | 8-20 g/L NaCl | Spike and SBR |
| IIa Screening 1 | 4, 5, 6, 7 | 6 Marine sediments | Inoculum source, nitrate, yeast extract | 30 g/L | Single batch |
| IIa Screening 2 | 8, 9 | 6 Marine sediments | Inoculum source, nitrate, yeast extract | 60 g/L | Single batch |
| IIb Large Culture 1 | 6 then 4 | Freeport Sediment | Perchlorate and nitrate then perchlorate alone | 30 g/L | Spike and SBR |
| IIc Ingredients | 4a, 4b, 4c | Marine Culture 1 | Fresh sediment, $S^{-2}$, trace metals, phosphate | 30 g/L | Single batch |
| IId, e Large Culture | 4c 2 | Culture fed medium 4c in IIc | Perchlorate then nitrate | 30 g/L | Spike and SBR |
| IIf Marine Culture 3 | 4c with 60 g/L NaCl | Freeport culture from screening exp 2 | Perchlorate | 60 g/L | Spike and SBR |

[a]See text for media ingredients corresponding with each medium number.

Six different synthetic media were used to test the ability of the marine sediments to reduce perchlorate in the presence of 30 and 60 g/L NaCl. All six media contained the following basal ingredients per liter of deionized water; 11 g $MgCl_2.6H_2O$, 1.4 g $CaCl_2.2H_2O$, 0.2 g $NaHCO_3$, 0.72 g KCl to represent the major components of seawater and 0.59 g $NH_4ClO_4$, 10 g $NaCH_3COO.3H_2O$ to supply perchlorate and an electron donor. Sulfate was omitted from the media to prevent the growth of sulfate-reducing bacteria, which could compete with perchlorate-reducing bacteria for the electron donor. The inocula contained large amounts of reduced sulfide, which was expected to act as a sulfur source for organism growth. Four media containing the basal ingredients specified above were prepared in 30 g/L NaCl: Medium 4 contained no additions; Medium 5 contained 1 g/L yeast extract; Medium 6 contained 0.685 g/L $NaNO_3$; Medium 7 contained 1 g/L yeast extract plus 0.685 g/L $NaNO_3$. Two media containing the basal ingredients plus the following additions were made up at 60 g/L NaCl: Medium 8 contained 1 g/L yeast extract, Medium 9 contained 0.685 g/L $NaNO_3$ and 1 g/L yeast extract.

The screening tests were performed by adding 3 g of each anaerobic marine sediment to 100 mL of each medium in a 125-mL serum bottle. The dissolved oxygen in the medium was not removed, however, the headspace of the serum bottle was purged with nitrogen gas for 3 min. The serum bottles were crimp-sealed with butyl-rubber stoppers and mixed on a rotary shaker and incubated at 30±2° C. for at least one month. Perchlorate and nitrate (when present) were measured as described below.

First Large Culture Development in 3% NaCl

A fresh sample of 3% (w/v) of Freeport #1 sediment was added to 1.5 L Medium 6 in a 2-L glass bottle reactor with a gas-collection device. The reactor was incubated at 30±2° C.

and shaken at a rate of 150 rpm. After the initial nitrate and perchlorate in the reactor were removed, 100 mg/L perchlorate was spiked into the reactor. Nitrate was not included in subsequent spikes or feeds until a stable perchlorate reducing culture was developed. This spike-feed procedure was continued until a reproducible perchlorate reduction rate was obtained. Then the feed protocol was switched from a spiked batch reactor mode to a sequencing-batch reactor (SBR) mode using a 30% replacement.

Batch Medium Ingredient Experiments in 3% NaCl

A 10-mL inoculum from the 1.5-L perchlorate reducing culture, which had lost activity due to SBR operation, was placed into 90 mL of medium 4a, 4b, or 4c prepared and dispensed into 125-mL serum bottles using strict anaerobic technique. Medium 4a 4a was prepared by adding 67 mM $Na_2S.9H_2O$, to Medium 4. Medium 4b was prepared by adding 0.1 mL trace metal solution and 0.1 mL 50 g/L $KH_2PO_4$ to Medium 4. Medium 4c was prepared by adding 0.5 mL 67 mM $Na_2S.9H_2O$, 0.1 mL trace metal solution, and 0.1 mL 50 g/L $KH_2PO_4$. The trace metal solution consisted of 10 g ammonium molybdate, 0.1 g zinc sulfate, 0.3 g boric acid, 1.5 g ferrous chloride, 10 g cobalt chloride, 0.03 g magnesium chloride, 0.03 g nickel chloride, and 0.1 g aluminum potassium sulfate per liter of water.

Second Large Culture Development in 3% NaCl

A second 1.5-L culture was enriched using Medium 4c by increasing the volume of the 90-mL culture from the nutrient test that had received Medium 4c by addition of fresh medium in 500 mL batches each time perchlorate was reduced to nondetect levels. The culture was maintained by spiking 100 mg/L perchlorate every three days. After every five feeds, 1 g/L sodium acetate.$3H_2O$ was spiked into the reactor as well. For several spike-feed cycles, samples were taken every two hours to measure the perchlorate concentration in the reactor.

Demonstration of the Effect of Nitrate in 3% NaCl

On the 8th feed of the second large culture, 500 mg/L nitrate-N was spiked with 100 mg/L perchlorate. Sodium acetate (3 g/L) was added as the electron donor for both perchlorate and nitrate reduction. Samples were again taken every 2 h, and the nitrogen gas produced in the reactor was measured in the gas collector. Both nitrate and perchlorate were spiked into the reactor for another two feeds when the perchlorate and nitrate in the current allotment of feed was reduced.

Perchlorate Reduction at 6% NaCl

Inocula of 10 mL of the Freeport #1 culture that reduced perchlorate at 60 g/L NaCl in the screening experiments were transferred to serum bottles containing 90 mL of Medium 4c adjusted to 60 g/L NaCl. After all of the perchlorate in the medium was removed, 100 mg/L perchlorate was spiked into the culture again. This feed procedure was continued 5-6 times to allow more cell mass to grow. Then 10 mL of the culture was transferred again to 90 mL fresh medium and spiked several times. Samples were taken to test perchlorate reduction by the culture at 60 g/L NaCl.

Analytical Methods

Samples of 1 mL (serum bottle tests) or 5 mL (1.5-L culture tests) were taken using nitrogen-flushed sterile syringes and filtered through 0.20 mm sterile syringe filters immediately after sampling, and kept in a refrigerator at 4° C. if not analyzed that day. Nitrate, sulfate, chlorate and perchlorate were measured using a Dionex DX-800 ion chromatograph configured with a GS50 gradient pump, CD25 conductivity detector, an ASRS-ULTRA suppressor, and an AS40 automated sampler. The suppressor was set at 300 mA. Separation was obtained using a Dionex IonPac AS16 anion analytical column (4 mm×250 mm) mm) and an AS16 guard column (4 mm×50 mm). A 225-mL sample loop was used to measure perchlorate concentration higher than 1 mg/L. The sample loop was switched to 1000 mL to measure lower perchlorate concentrations. The detection limit for perchlorate was 5 ppb in de-ionized water and 500 ppb in the presence of X8 g/L NaCl concentration. A gradient eluent was delivered in order to separate all peaks: Initially, a flow of 5 mM KOH was maintained for 2 min at a flow rate of 1.0 mL/min. The eluent KOH composition was changed to 10 mM in a linear gradient from 2 min to 14 min with the flow rate unchanged. A linear gradient was then used to change the eluent composition to 55 mM KOH from 14 min to 20 min while the flow rate was increased to 1.5 mL/min at 20 min. These conditions were held constant from 20 to 27 min. All water used was de-ionized, reagent grade with 18 MO cm resistivity.

Nitrite was analyzed by absorbance using the method described in *Methods of Seawater Analysis* [26] because it could not be resolved from the chloride peak during IC analysis. The absorbance was measured in 1-cm cuvettes at 540 nm with Lambda 3B UV/VIS spectrophotometer, Perkin-Elmer Corporation.

Culture Development from Activated Sludge

The three cultures developed from activated sludge were fed acetate as the electron donor and (1) nitrate and perchlorate, or (2) perchlorate only, or (3) nitrate only as the added electron acceptors at an initial NaCl concentration of 8 g/L.

All three cultures were able to adapt quickly to the removal of perchlorate and nitrate from the media when the NaCl concentration was 8 g/L. The two cultures fed perchlorate only could not tolerate more than 15 g/L NaCl in the media. The culture fed with perchlorate and nitrate never showed recovery from any step increase in salt concentration. These results suggest that the presence of nitrate may have some negative effect on perchlorate reduction at higher salt concentrations. Because the culture fed with perchlorate alone did not acclimate to more than 15 g/L NaCl, there must be other physiological problems as well.

The fact that neither culture was able to acclimate to the targeted 30 g/L NaCl concentration whether or not nitrate was present, demonstrates that the sewagesludge-acclimation approach was not a successful strategy to obtain a culture capable of reducing perchorate and nitrate at 30 g/L NaCl. The control culture that was fed only nitrate was able to adapt to 30 g/L NaCl with no apparent problems.

Culture Development from Marine Sediment

Screening Experiments in 3% and 6% NaCl

A 30-day sample of six marine sediments incubated in synthetic media with 30 or 60 g/L NaCl revealed that the organisms in only three of the sediments—Freeport #1, Fourchon #1 sand Fourchon #3—were capable of reducing perchlorate. All 1 six sediments reduced at least 98% of the nitrate in all of the media having nitrate (results not shown).

In the presence of 60 g/L NaCl, no perchlorate reduction was observed by the 30-day sampling period while at least 98% of the nitrate in all of the media that contained nitrate was reduced. By the 45-day sample, the Freeport#1, Fourchon#1 and Fourchon #3 sediments showed perchlorate reduction. Again, the other three sediments did not show much perchlorate reduction.

First Large Culture Development in 3% Nacl

The Freeport #1 sediment was selected as the most consistent inoculum and Medium 4 containing perchlorate and nitrate at 30 g/L NaCl was selected as the growth medium to enrich a larger-scale perchlorate reducing culture. This 1.5-L Freeport ##1 culture experienced a 28-day lag period, but was then able to reduce 510 mg/L perchlorate to 4.93 mg/L within 56 days. Nitrate was reduced within the first week of incubation. Thereafter, along with each spike feed of 100 mg/L perchlorate, the perchlorate reduction rate increased, and an increase of the biomass was observed in the reactor. After 3-4 perchlorate spikes, the culture could remove 90% of perchlorate fed in the medium within 30 h.

In order to simulate the ion-exchange brine reuse process the culture was then operated under SBR mode. This dramatically decreased perchlorate reduction. It took more than six days to reduce the same amount of perchlorate for the first feed in the SBR mode, and more than nine days for the second feed using SBR conditions. This suggested that some ingredient in the initial mud inoculum that was important for perchlorate reduction by the culture was depleted during medium replacement.

Batch Medium Ingredient Experiments in 3% NaCl

The original Freeport 1 marine sediment was rich, black, and very anaerobic. To determine if there were abiotic factors present in the mud that enabled the culture to reduce perchlorate rapidly, fresh, autoclaved Freeport marine sediment was added to duplicate transfers of the ineffective large culture to determine if this could return the culture to a rapid perchlorate reduction rate. Adding the autoclaved sediment had a beneficial effect. The culture containing sediment-amended medium had less perchlorate remaining after a five-day incubation period than the controls. This trend was again observed after a second spike of perchlorate into the cultures (not shown).

The most obvious abiotic factors in the sediment that could be beneficial to the culture were sulfide or other mineral nutrients. To determine which components might be responsible for the beneficial effect, $Na_2S$ and trace minerals were added to the culture. The addition of phosphate as a traditional biological nutrient was also examined. The addition of Na 2S, trace metals and phosphate together caused the most beneficial effect. The addition of Na2S alone somewhat improved perchlorate reduction, whereas trace metals and phosphate only had no beneficial effect (results not shown). Na2S provides sulfur for microbial growth, scavenges oxygen, and reduces the redox potential in the culture. Lower redox potential is helpful to anaerobic perchlorate reduction. Trace metals and phosphate are important to the bacteria's growth and metabolism, especially for bacteria growing in strict environments (anaerobic and high saline). From these results, this marine culture needs both low redox potential and trace metals to reduce perchlorate.

Second Large Culture Development in 3% NaCl

The culture growing in trace metal-, phosphate- and Na2S-amended Medium4c was used to create another 1.5 L culture. After several spike feeds of B100 mg/L perchlorate, this culture was capable of removing 70-100 mg/L perchlorate within 8 h. After r 48 daily SBR feedings of Medium 4c from this point, samples were collected every two hours and analyzed for perchlorate during one react phase. The results showed that the culture performance was stable. This culture continued to reduce its allotment of perchlorate in each daily feed or SBR operation for two months.

Demonstration of the Effect of Nitrate in 3% NaCl

The ability of the culture that could degrade perchlorate successfully in 30 g/L NaCl to reduce perchlorate in the presence of nitrate was also tested. The addition of 9× as much nitrate (molar basis) as perchlorate did not effect the perchlorate reduction by the culture. Perchlorate was reduced within 6 hour with or without the presence of nitrate. The perchlorate reduction curves were modeled with first order kinetics and the k-values were 0.627/h and 0.514/hour. Nitrate (9 mM) was also reduced within 10 h.

The culture adapted to denitrification very quickly by the third spike feed, when the 92 mg/L perchlorate and 539 mg/L nitrate-N were both reduced (98%) within 5 h. At least 153 mL nitrogen gas was collected, which is comparable to the theoretical gas production (147-155 mL assuming 1 mol $NO_3$ was converted to 0.45-0.48 mol nitrogen gas, 30° C., one atm. total pressure, and water-saturated air). This suggests that this marine culture can denitrify at a rapid rate along with the reduction of perchlorate.

A microscopic examination of a Gram-stained sample of the culture revealed that this was not a pure culture but the majority of the organisms present in the culture were Gram-negative, slightly curved rods.

Perchlorate Reduction at 60 g/L NaCl

Although 30 g/L NaCl can be used to regenerate the perchlorate-spent resin, the preferred concentration of NaCl in the ion-exchange brine is 60 g/L (6%) or higher. Initial batch screening tests provided a culture that was initially capable of reducing perchlorate in a medium that contained 60 g/L NaCl within 45 days, but lost the capability in the subsequent transfer to fresh medium with 60 g/L NaCl. Once it was learned that the 30 g/L culture required sulfide, trace metals and phosphate, these ingredients were added to revive the culture in the 60 g/L medium. After 1 or 2 transfers to fresh Medium 4c adjusted to 60 g/L NaCl and several spike feeds of 100 mg/L perchlorate, a stable culture capable of reducing perchlorate within 1 day at 60 g/L NaCl was obtained. The culture was capable of removing more than 90% of 80-100 mg/L perchlorate within at most 29 hour. The data from the curves presented in FIG. 5 were modeled using zero-order kinetics. The average perchlorate degradation rate was 3.61 mg/L h. The fit to a zero-order curve suggests that there are low numbers of perchlorate-degrading microbes present in this culture so the degradation rate is saturated even at low perchlorate concentrations.

The pathway of perchlorate degradation involves the sequential reduction of perchlorate to chlorate, chlorite, and finally, chloride. The analytical method used allowed the detection and quantification of perchlorate, and chlorate, but not chlorite. The chloride produced from the reduction of perchlorate could not be quantified because of high background of NaCl (3-6%) in the media. For the culture enriched from the Freeport #1 sediment, chlorate was observed only transiently in early enrichment cultures, but was never observed in mature cultures. The completion of the respiration of perchlorate can be inferred by a change in redox potential indicated by the color change of resazurin due to $O_2$ produced in the final reaction. This was observed, again, in enrichment cultures, but rarely in the mature cultures. This does not mean that complete metabolism was not achieved but only that the $O_2$ was removed as fast as it was produced.

An electron balance was conducted for electron use by the perchlorate-reducing culture enriched from Freeport#1 sediment. In five spike feed cycles, 40 meq of perchlorate ($ClO_4^-$ to $Cl^-$) were fed and 59 meq of acetate ($CH_3COO^-$ to $CO_2$) were used. The electron equivalence of acetate is higher than the equivalence of perchlorate, which supports a total reduction of perchlorate to chloride and indicates that acetate was also used for biomass generation.

Two cultures capable of degrading perchlorate and nitrate in high salt solutions were developed from marine inoculum. One culture is capable of reducing up to 100 mg/L perchlorate and 500 mg/L nitrate-N within 5 h in the presence of 30 g/L NaCl. The other is capable of reducing 100 mg/L perchlorate in the presence of 60 g/L NaCl within 24 h. The growth conditions to maintain these cultures in a healthy state require the maintenance of strictly anaerobic conditions and the addition of trace metals, $Na_2S$ and phosphate.

Inocula

Mixed cultures capable of perchlorate and nitrate reduction in the presence of 3% and 6% NaCl synthetic medium were used as inocula in this study. The anaerobic cultures were enriched from marine mud and have been fed with synthetic medium as shown in Table 2 in the lab for an extended period of time to establish proven perchlorate and nitrate degrading capacity.

TABLE 2

Comparison of Ingredients in Synthetic Medium and 2 Ion-exchange Brines

| Component | 3% Synthetic Medium | 3% Spent Pilot Plant Brine* | Ion-Exchange regenerant Brine |
|---|---|---|---|
| pH | 7 | 9.1 | 8.1 |
| NaCl | 30 g/L | 30 g/L | 53 g/L |
| $Mg^{2+}$ | 1300 mg/L | 6.5 mg/L | ** |
| $Ca^{2+}$ | 380 mg/L | 24.5 mg/L | 0 |
| $K^+$ | 380 mg/L | None | ** |
| $NH_4^+$ | Present | 2 mg/L | ** |
| $NO_3^-$ | None | 510 mg/L | 2000 mg/L |
| $SO_4^{2-}$ | None | 800 mg/L | 2810 mg/L |
| $ClO_4^-$ | 400 μg/L | 1400 μg/L | 4300 μg/L |
| $HCO_3^-$ | 145 mg/L | 00 mg/L | 11000 mg/L |
| $H_2PO_4^-$ | 35.6 mg/L | None | ** |
| $Na_2S \cdot 9H_2O$ | 80 mg/L | None added | None added |
| Trace Metal | Present | None added | None added |

*Estimated based on MWH analysis and measurements of components of ion-exchange spent brine.
** Not analyzed for in the ion-exchange regenerant brine.

The cultures were maintained in six, 1.5-L sealed glass bottle reactors as sequencing batch reactors by weekly settling, decanting 50-60% of the supernatant (spent medium) with fresh synthetic media typically once a week. Between the replacements, perchlorate stock solution (100 g/L) was spiked in the cultures to a final perchlorate concentration of about 100 mg/L, daily. Acetate served as the sole electron donor. Prior to each experiment, volatile suspended solids (VSS) concentration was measured for the Parent culture so that VSS concentration present in the subcultures could be estimated.

The inoculum for the pilot plant was prepared by taking 500 mL of the 3% synthetic medium culture and increasing the volume in several steps (including some spikes of perchlorate to high levels to increase biomass) until the culture was 20 gallons.

Pilot Plant Operation and Brine Generation

A spent brine solution from the ion-exchange process, ion-exchange brine solution, was collected to be representative of an average of a fall range of brine solution quality encountered throughout a cycle of ion-exchange column regeneration. The sample was transported in a headspace free 15-gallon container and stored at 4° C. until use in individual experiments. Chemical analysis and microbial characterization tests were conducted on the samples of brine as received. Table 2 lists the major cations present in the brine after dilution to 3% NaCl with deionized water.

Experimental Conditions

Initial laboratory studies were performed by omitting specific medium ingredients from the synthetic medium (see Table 2). These experiments suggested that the divalent cations ($Ca^{2+}$, $Mg^{2+}$) and the monovalent cation ($K^+$) were important ingredients in the synthetic medium. When these items were omitted the perchlorate reduction rate was reduced.

To confirm that the addition of these minerals to the brine would improve the stability of perchlorate degradation in brine solution by the culture three experiments were performed. Two using brine solution generated using the pilot plant as described above (and conducted simultaneously in the lab and pilot plant) and one using an ion-exchange regenerant brine solution.

Bench Scale Pilot Plant Brine Treatment

Since initial results suggested that the culture could not directly treat 6% pilot plant brine solution, the brine collected from the pilot plant for treatment was diluted to 3% NaCl by the addition of an equal amount of deionized water which had been boiled and cooled under a flush of nitrogen gas. Ambient oxygen was purged from the brine by bubbling with oxygen-free nitrogen gas for approximately 1 hour and 0.3 mg/L resazurin was added as a redox indicator.

Inoculum from the 3% NaCl parent culture was prepared for use (i.e., the residual nutrient components from the parent culture were removed) by centrifuging the culture (1500 rpm, at 4° C.) for approximately 12-25 minutes. After centrifuging, the supernatant was decanted and resuspended in 3% NaCl solution. This procedure was repeated twice. The final harvested cell pellet was re-suspended in 3% NaCl solution and 2 mL of this suspension was added to about 100 mL of amended brine solution in a 150 mL serum bottle that had been flushed with $N_2$ gas for at least five minutes and then sealed with butyl rubber stoppers and aluminum crimp seals. The results from $Mg^{2+}$ and $Ca^{2+}$ measurements showed that insignificant amounts of the cations were carried over with the inoculum. The cultures were spiked with about 100 mg/L acetate and the appropriate amounts of concentrated metal ions (individually or all together) to adjust the concentrations of $Mg^{2+}$ to 130 mg/L, $Ca^{2+}$ to 40 mg/L, or $K^+$ to 40 mg/L as their chloride salts; The initial pH of the brine was adjusted to 7.5 during the initial transfer and no pH adjustment was done during the subsequent SBR feeds. The cultures were incubated while shaking at about 120 rpm at room temperature.

The performance of the resulting subcultures, namely, Mg, Ca, K, and (Mg+Ca+K) (in triplicate), was compared with the performance of triplicate subcultures fed brine with no cation amendment. At the end of the first incubation period (while the transfer removed its perchlorate and nitrate), there was approximately 40 mL of culture left in each serum bottle due to frequent sampling. The first SBR feed was accomplished by adding 60 mL of 3% diluted spent brine, and subsequent feeds were accomplished using true SBR procedures. The cations and acetate were spiked directly into the cultures to the levels described above at the beginning of each feed cycle. The magnesium and calcium concentrations were measured at the beginning and end of the experiment by flame atomic absorption spectrometry.

Biological Treatment of Brine at the Pilot Plant

Effect of Magnesium on Treatment of Ion-Exchange Brine Solution

To evaluate the impact of magnesium addition on the biological treatment of ion-exchange brine solution, two 300 mL cultures were developed from a combination of 3 and 6% NaCl parent cultures and fed to an ion-exchange brine solution that had been purged with nitrogen to scrub oxygen, and amended 22 g/L $MgCl_2 \cdot 6H_2O$ (2.63 g/L $Mg^{2+}$). The culture was spiked with acetate to reach a concentration of about 100 g/L with each feed.

Analytical Procedures

Liquid samples were taken using plastic sterile syringes and filtered through 0.20 μm syringe filter. The samples were kept in glass vials and refrigerated at 4° C. before analysis. Perchlorate concentrations were determined by using a Dionex DX-500 ion chromatograph (Dionex Corp., Sunnyvale, Calif.) equipped with a Dionex Ionpac AS16 4 mm separation column, an AG16 4 mm guard column, a GS50 gradient pump, an AS40 automated sampler, and a CD25 conductivity detector. An AMMS suppressor using 70 mM $H_2SO_4$ solution as regenerant was also used in an external cycling mode. A 1000 μL sample loop was used to detect the low perchlorate concentrations in the ion-exchange brine. The eluent concentration was 65 mM KOH prepared with ultra-pure water with 18 MΩ cm resistivity.

Nitrate, acetate and sulfate analysis were performed using a Dionex DX-100 Ion chromatograph (Dionex Corp., Sunnyvale, Calif.) equipped with an IonPac AS12 4 mm separation column, an AG12 4 mm guard column, an AS40 automated sampler, an ASRS-ULTRA suppressor (100 mA), and a 25 μL sample loop. The eluent used was a solution containing 0.3 mM $NaHCO_3$ and 2.7 mM $Na_2CO_3$ and the flow rate was 1.25 mL/min.

$Mg^{2+}$, $Ca^{2+}$ and $K^+$ concentrations were determined by flame flame atomic absorption spectrometry (Perkin Elmer, AAnalyst 300) equipped with Perkin Elmer Lumina™ Lamp. Volatile suspended solids (VSS) were measured according to the procedures described in Standard Methods (APHA, 1998).

Ingredient Effects on Microbial Growth in Synthetic Brine Solutions

Figure 2:
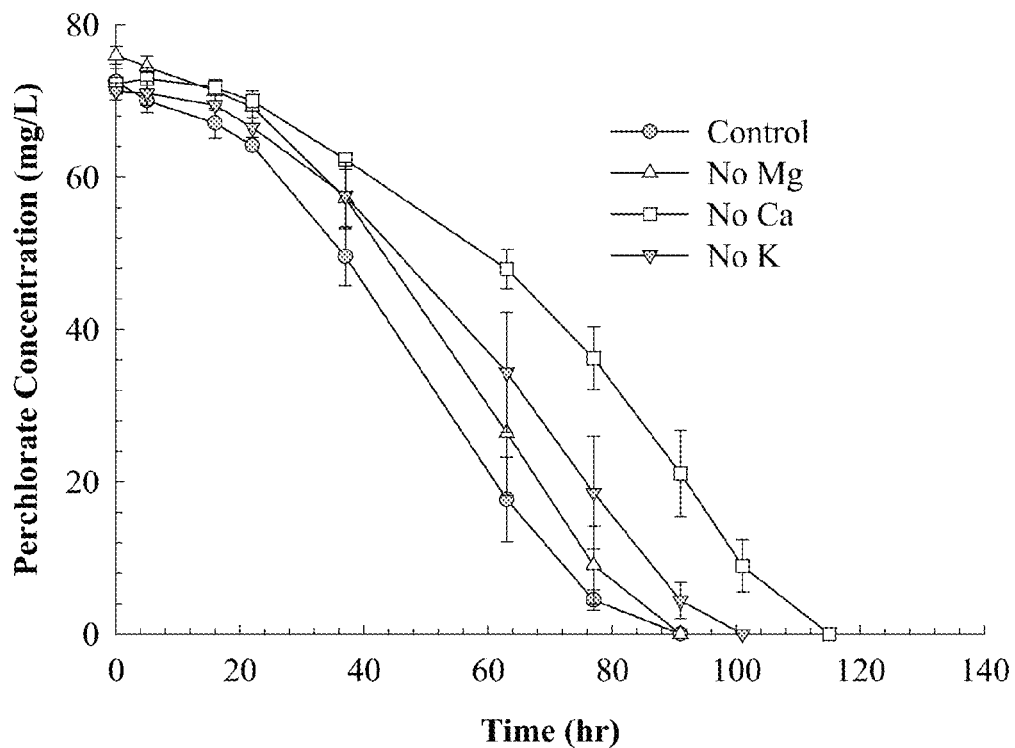
FIG. 2 depicts a plot of data verifying that a biological culture does not degrade perchlorate in the absence of $Ca^{2+}$, $Mg^{2+}$, or $K^+$ ions in synthetic brine solution containing 60 g/L NaCl.

Later, the inventors designed experiments to determine the effects of different ingredients present in the synthetic brine solutions. The inventors identified major differences in the relative concentrations of $Mg^{2+}$, $Ca^{2+}$, $K^+$ ions in the synthetic medium verses the concentrations of those ions in seawater. Several experiments were performed to determine the effects of adding these cations to brine or leaving them out of the synthetic medium. Example results are presented in FIG. 2, where a 60 g/L synthetic medium was tested to determine changes in microbial activity when each of the three above-identified ions are removed from the medium. As shown in FIG. 2, the results showed that leaving out $Mg^{2+}$, $Ca^{2+}$, or $K^+$ caused a slowing of perchlorate degradation, i.e., removing each ion was detrimental to the operation of the culture to degrade perchlorate.

After reviewing these results, the inventors focused on the concentration of divalent cations and specifically on a mole ratio of divalent cations to monovalent cation ($Na^+$). Experiments were then directed to laboratory and pilot plant run to determine the effects of a divalent to monovalent cation mole ratio using $M^{2+}$ and/or $Ca^{2+}$ as the divalent cations. The experiments were directed to determine the divalent/monovalent cation mole ratio, as well as to determine which of these cations would allow the generation of brine solution that could support a stable culture and to determine the operating ranges of the brine solution. The inventors found that the addition of either $Ca^{2+}$ or $Mg^{2+}$ to adjust the divalent to monovalent cation mole ratio resulted in a brine solution capable of supporting microbial cultures, which are capable of reducing perchlorate concentration in the brine solution rapidly and completely. However, because $Ca^{2+}$ ions precipitated out of the brine due to high levels of carbonates, we turned our attention to the addition of $Mg^{2+}$ ions, which did not precipitate in brine solution having high concentrations of carbonates ions. The addition of either cation was beneficial: $Ca^{2+}$ briefly improved the perchlorate destruction rate in the brine solution prior to its elimination by precipitation, whereas $Mg^{2+}$ remained in the brine solution and improved its long-term performance for perchlorate destruction.

Figure 3:
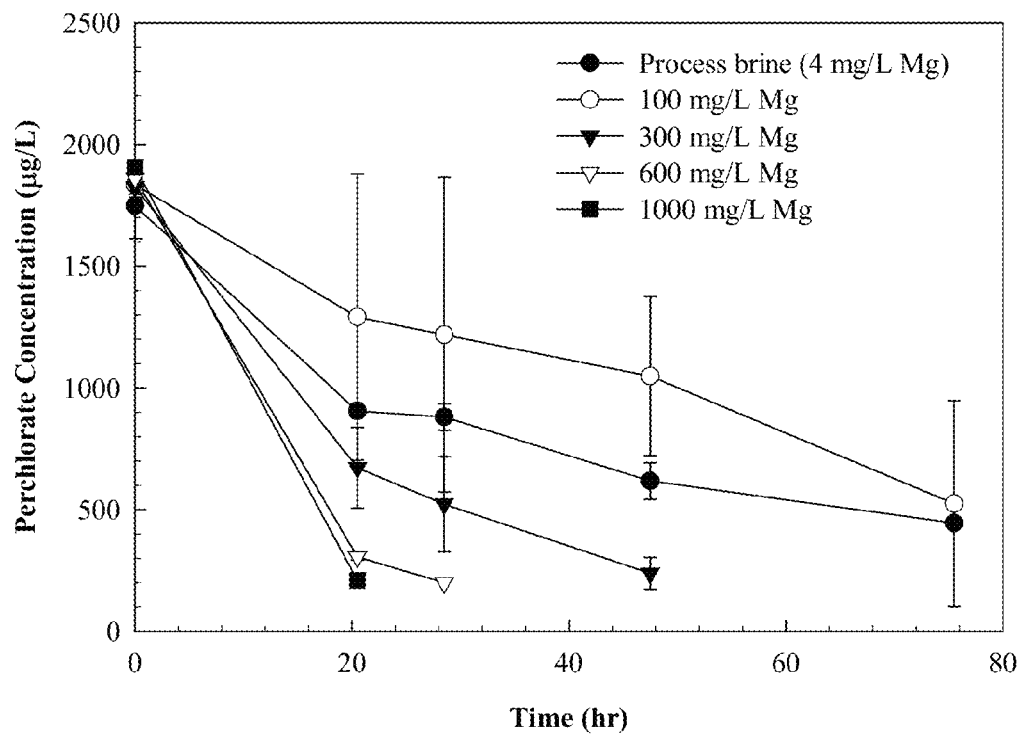
FIG. 3 depicts a plot of data showing that when $Mg^{2+}$ is added to an ion-exchange brine solution at different concentrations, the ability for a biological culture to degrade perchlorate rapidly increases with increasing $Mg^{2+}$ concentration.
Figure 4:
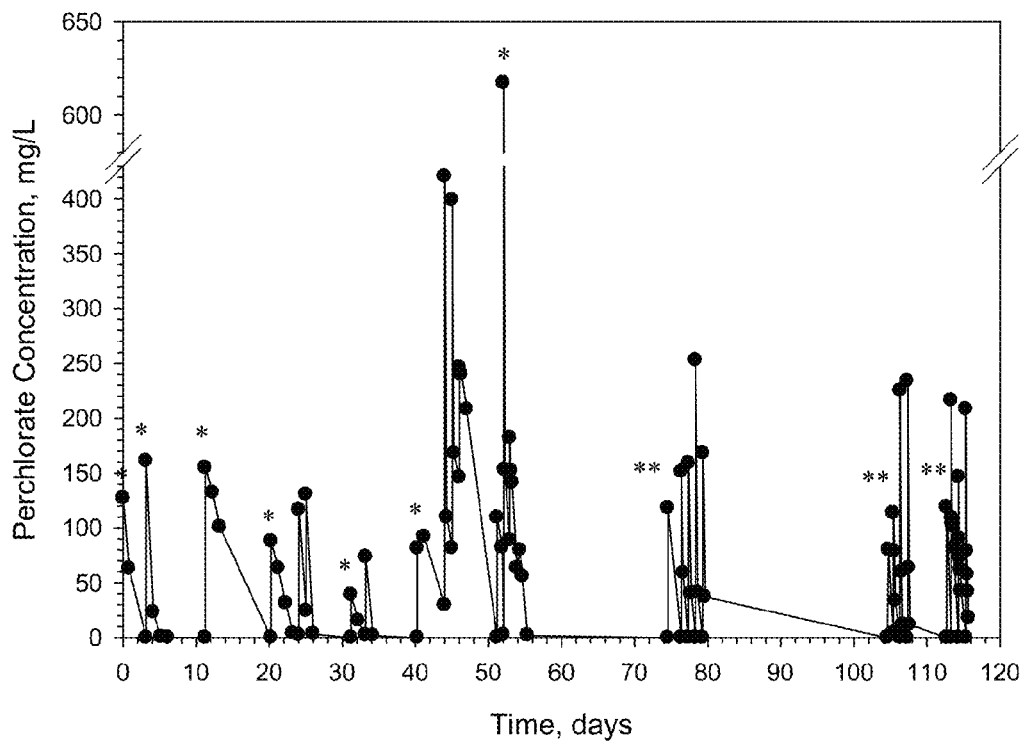
FIG. 4 depicts a plot of data showing that when a culture of perchlorate and nitrate reducing organisms were grown in a synthetic medium containing 60 g/L NaCl and 1100 g/L $Mg^{2+}$ a ratio of 0.05 mole $Mg^{2+}$/mole $Na^+$, perchlorate was degraded to non-detectable levels in 2-8 days, whereas the degradation time was less than one day when the $Mg^{2+}/Na^+$ ratio was increased to 0.1 mole/mole.

The inventors also found that the culture in brine solutions having a 60 g/L NaCl concentration required more $Mg^{2+}$ than the culture in brine solutions having a 30 g/L NaCl concentration, especially when nitrate is also present in the culture. These results verify that the requirement is not for a single concentration of divalent cations such as $Mg^{2+}$, but for a ratio of divalent to monovalent cation mole ratio or the $Mg^{2+}$ to $Na^+$ mole ratio. Currently, the inventors know that when the ratio of divalent to monovalent cation mole ratio is at or above about 0.05 as shown in FIGS. 2 and 3, the cultures can reduce perchlorate rapidly in brine solution having 30 or 60 g/L NaCl, and when the ratio is increased, the culture performance increases as well. This data evidenced that a minimum concentration of 600 mg/L of $Mg^{2+}$ in a brine solution including 30 g/L NaCl, which corresponds to a $M^{2+}/Na^+$ mole ratio of at or above 0.05.

As a result of these experiments, the inventors have developed a novel biological perchlorate destruction process for treating ion-exchange brine so that the brine solution can be reused or disposed of as non-hazardous waste. This ion-exchange biological perchlorate destruction process eliminates perchlorate ion from waste brine solution and conserves regenerant brine solution for reuse. The inventors have also discovered one preferred biologically stable brine solution for the destruction of perchlorate contaminated brine solutions, where the brine solution has sufficient magnesium ions to produce a magnesium to sodium or divalent to monovalent cation mole ratio ≥0.05.

The inventors also found that $Ca^{2+}$ ions can be added to the brine solution to adjust the divalent to monovalent cation mole ratio and achieve a biologically stable brine solution capable of microbial growth and proliferation, where the microbes are capable of decomposing, perchlorate. However, $Ca^{2+}$ is not a preferred ion, because ion-exchange brines typically contain high concentrations of carbonates ion that tend to precipitate $Ca^{2+}$ ions. Thus, using $Ca^{2+}$ ions as the divalent metal will require a $Ca^{2+}$ source be added to each batch or on a continuous basis, whereas $Mg^{2+}$ does not precipitate out, and is able to persist in the brine solution through the recycle process. However, $Ca^{2+}$ or a mixture of $Mg^{2+}$ and $Ca^{2+}$ can be used in contaminated brine solutions having no or low concentrations of carbonates.

Figure 5:
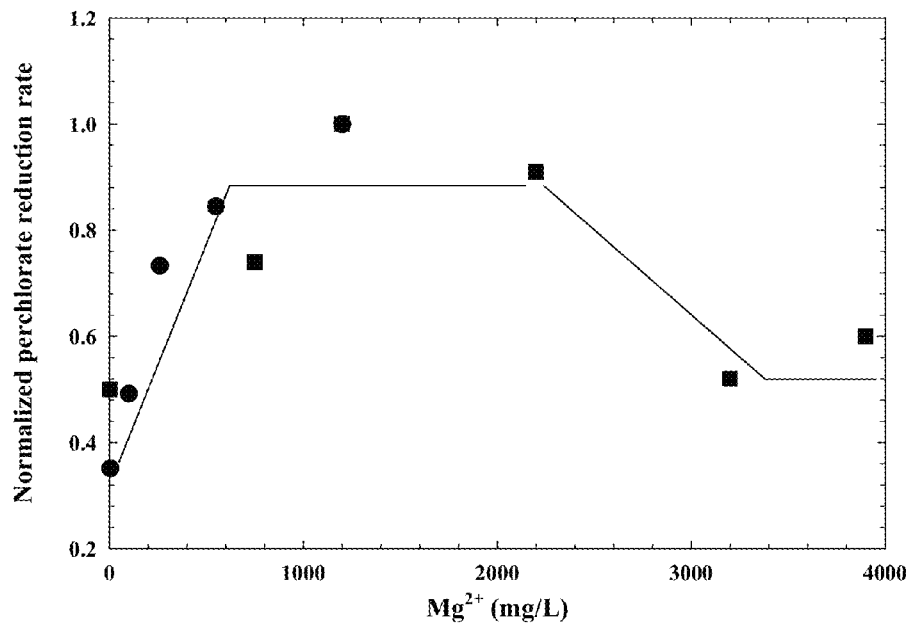
FIG. 5 depicts a plot of data showing normalized perchlorate degradation rate demonstrating the effect of Magnesium addition on the degradation of perchlorate from ion-exchange brine.

The perchlorate degradation rates from two separate experiments using cultures fed ion-exchange brine produced from a pilot plant operated by Montgomery Watson Harza in LaPuente Calif., have been normalized; the highest rate in each experiment set as 1 and the others normalized to that as shown in FIG. 5. Experiment 1 (circles) was carried out in low biomass conditions, while experiment 2 (squares) used high biomass conditions. The optimal magnesium addition in a 3% NaCl ion-exchange brine solution was about 1200 mg/L $Mg^{2+}$. Comparatively higher perchlorate reduction rates were found when the subcultures were amended with 300-2200 mg/L $Mg^{2+}$. Out of this range, however, the rate of perchlorate was reduced compared to that of the optimal magnesium amendment.

Figure 6:
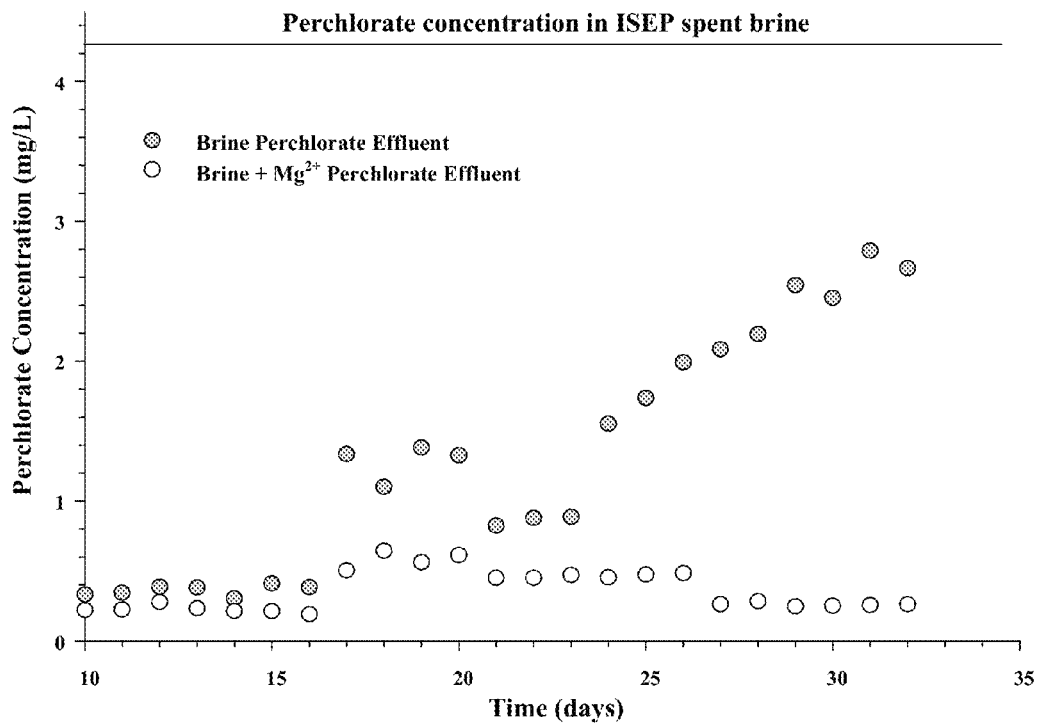
FIG. 6 depicts a plot of data demonstrating the effect of magnesium ion concentration on the degradation of perchlorate in an ion-exchange brine.

Direct demonstration of the effect of the magnesium ions on the degradation of perchlorate in ion-exchange brine solutions was demonstrated in an actual perchlorate removal system. The perchlorate concentrations in the effluents, after 22 hour react and 2 hour settle periods, during daily 50% volume replacement of SBR feeds of ion-exchange brine produced by the ion-exchange brine solution process as operated in La Puente Calif. were followed over a 32 day period as shown in FIG. 6. The brine solution was amended with acetate as an electron donor. One culture received brine that also received magnesium amendment of 2.6 g/L MgCl. The NaCl concentration in the brine was 52 g/L. Each culture was 300 mL in volume.

The results demonstrate that the addition of magnesium to the ion-exchange brine solution is necessary for long term stable microbial activity and long term perchlorate degradation.

In an analogous fashion, brine solutions contaminated with other non ion-exchangable pollutants can be treated in brine solutions having a divalent to monovalent mole ratio of at least 0.05. For example, for oil contaminated brine solutions, the brine solution is adjusted to a divalent to monovalent cation mole ratio at or above about 0.05 and inoculated with microorganisms capable of growing in the stabilized brine solution and capable of anaerobic/anoxic degradation of the oil in the oil contaminated brine solution. For example, for brine solution contaminated with other pollutants, the brine solution is adjusted into the stable regime evidence by a divalent to monovalent cation mole ratio and inoculated with microorganisms capable of growing in the stabilized brine solution and capable of anaerobic/anoxic degradation of the pollutant in the pollutant contaminated brine solution.

REFERENCES

The following references are included in this application and some are cited in the text of the application:

American Lung Association. Fact Sheet: Chronic Obstructive Pulmonary Disease (COPD).

DeMeo, D. L. and Ginns, L. C. Lung transplantation at the turn of the century. Annu. Rev. Med. 52, 185, 2001.

Alsberg, E., Anderson, K. W., Albeiruti, A., Rowley, J. A., and Mooney, D. J. Engineering growing tissues. Proc. Natl. Acad. Sci. U. S. A 99, 12025, 2002.

Terada, S., Sato, M., Sevy, A., and Vacanti, J. P. Tissue engineering in the twenty-first century. Yonsei Med. J. 41, 685, 2000.

Korbling, M. and Estrov, Z. Adult stem cells for tissue repair—a new therapeutic concept? N. Engl. J. Med. 349, 570, 2003.

Hung, S. C., Chen, N. J., Hsieh, S. L., Li, H., Ma, H. L., and Lo, W. H. Isolation and characterization of size-sieved stem cells from human bone marrow. Stem Cells 20, 249, 2002.

Caplan, A. I. and Bruder, S. P. Mesenchymal stem cells: building blocks for molecular medicine in the 21st century. Trends Mol. Med. 7, 259, 2001.

Petersen, B. E., Bowen, W. C., Patrene, K. D., et al. Bone marrow as apotential source of hepatic oval cells. Science 284, 1168, 1999.

Hess, D., Li, L., Martin, M., et al. Bone marrow-derived stem cells initiate pancreatic regeneration. Nat. Biotechnol. 21, 763, 2003.

Fuchs, J. R., Nasseri, B. A., and Vacanti, J. P. Tissue engineering: a 21st century solution to surgical reconstruction. Ann. Thorac. Surg. 72, 577, 2001.

Douglas, W. H., McAteer, J. A., Dell'orco, R. T., and Phelps, D. Visualization of cellular aggregates cultured on a three dimensional collagen sponge matrix. In Vitro 16, 306, 1980.

Lwebuga-Mukasa, J. S., Ingbar, D. H., and Madri, J. A. Repopulation of a human alveolar matrix by adult rat type II pneumocytes in vitro. A novel system for type II pneumocyte culture. Exp. Cell Res. 162, 423, 1986.

Sugihara, H., Toda, S., Miyabara, S., Fujiyama, C., and Yonemitsu, N. Reconstruction of alveolus-like structure from alveolar type II epithelial cells in three-dimensional collagen gel matrix culture. Am. J. Pathol. 142, 783, 1993.

Chakir, J., Page, N., Hamid, Q., Laviolette, M., Boulet, L. P., and Rouabhia, M. Bronchial mucosa produced by tissue engineering: a new tool to study cellular interactions in asthma. J. Allergy Clin. Immunol. 107, 36, 2001.

Paquette, J. S., Moulin, V., Tremblay, P., et al. Tissue-engineered human asthmatic bronchial equivalents. Eur. Cell Mater. 7, 1, 2004.

Agarwal, A., Coleno, M. L., Wallace, V. P., et al. Two-photon laser scanning microscopy of epithelial cell-modulated collagen density in engineered human lung tissue. Tissue Eng. 7, 191, 2001.

Zuk, P. A., Zhu, M., Mizuno, H., et al. Multilineage cells from human adipose tissue: implications for cell-based therapies. Tissue Eng. 7, 211, 2001.

Miura, M., Gronthos, S., Zhao, M., et al. SHED: stem cells from human exfoliated deciduous teeth. Proc. Natl. Acad. Sci. U.S.A. 100, 5807, 2003.

Toma, J. G., Akhavan, M., Fernandes, K. J., et al. Isolation of multipotent adult stem cells from the dermis of mammalian skin. Nat. Cell Biol. 3, 778, 2001.

Jankowski, R. J., Deasy, B. M., and Huard, J. Muscle-derived stem cells. Gene Ther. 9, 642, 2002.

Herzog, E. L., Chai, L., and Krause, D. S. Plasticity of marrow-derived stem cells. Blood 102, 3483, 2003.

Wagers, A. J. and Weissman, I. L. Plasticity of adult stem cells. Cell 116, 639, 2004.

Magdaleno, S. M., Barrish, J., Finegold, M. J., and DeMayo, F. J. Investigating stem cells in the lung. Adv. Pediatr. 45, 363, 1998.

Bishop, A. E. Pulmonary epithelial stem cells. Cell Prolif. 37, 89, 2004.

Kotton, D. N., Summer, R., and Fine, A. Lung stem cells: new paradigms. Exp. Hematol. 32, 340, 2004.

Krause, D. S., Theise, N. D., Collector, M. I., et al. Multiorgan, multi-lineage engraftment by a single bone marrow-derived stem cell. Cell 105, 369, 2001.

Summer, R., Kotton, D. N., Sun, X., Ma, B., Fitzsimmons, K., and Fine, A. Side population cells and Bcrp1 expression in lung. Am. J. Physiol. (Lung Cell. Mol. Physiol.) 285, L97, 2003.

Giangreco, A., Shen, H., Reynolds, S. D., and Stripp, B. R. Molecular phenotype of airway side population cells. Am. J. Physiol. (Lung Cell. Mol. Physiol.) 286, L624, 2004.

Abe, S., Lauby, G., Boyer, C., Rennard, S., and Sharp, J. Transplanted BM and BM side population cells contribute progeny to the lung and liver in irradiated mice. Cytotherapy. 5, 523, 2003.

Vacanti, M. P., Roy, A., Cortiella, J., Bonassar, L., and Vacanti, C. A. Identification and initial characterization of spore-like cells in adult mammals. J. Cell. Biochem. 80, 455, 2001.

Ali, N. N., Edgar, A. J., Samadikuchaksaraei, A., et al. Derivation of type II alveolar epithelial cells from murine embryonic stem cells. Tissue Eng. 8, 541,2002.

Hong, K. U., Reynolds, S. D., Giangreco, A., Hurley, C. M., and Stripp, B. R. Clara cell secretory protein-expressing cells of the airway neuroepithelial body microenvironment include a label-retaining subset and are critical for epithelial renewal after progenitor cell depletion. Am. J. Respir. Cell. Mol. Biol. 24, 671, 2001.

Wuenschell, C. W., Sunday, M. E., Singh, G., Minoo, P., Slavkin, H. C., and Warburton, D. Embryonic mouse lung epithelial progenitor cells co-express immunohistochemical markers of diverse mature cell lineages. J. Histochem. Cytochem. 44, 113, 1996.

Warburton, D., Schwarz, M., Tefft, D., Flores-Delgado, G., Anderson, K. D., and Cardoso, W. V. The molecular basis of lung morphogenesis. Mech. Dev. 92, 55,2000.

Van Lommel, A., Bolle, T., Fannes, W., and Lauweryns, J. M. The pulmonary neuroendocrine system: the past decade. Arch. Histol. Cytol. 62, 1, 1999.

Evans, M. J. and Plopper, C. G. The role of basal cells in adhesion of columnar epithelium to airway basement membrane. Am. Rev. Respir. Dis. 138, 481, 1988.

Have-Opbroek, A. A. Lung development in the mouse embryo. Exp. Lung. Res. 17, 111, 1991.

Reynolds, S. D., Giangreco, A., Power, J. H., and Stripp, B. R. Neuroepithelial bodies of pulmonary airways serve as a reservoir of progenitor cells capable of epithelial regeneration. Am. J. Pathol. 156, 269, 2000.

Mikos, A. G., Bao, Y., Cima, L. G., Ingber, D. E., Vacanti, J. P., and Langer, R. Preparation of poly(glycolic acid) bonded fiber structures for cell attachment and transplantation. J. Biomed. Mater. Res 27, 183, 1993.

BASF Pluronic Website. http://www.basf.com/static/OpenMarket/Xcelerate/Preview_cid-982931199819_-pubid-974236729499_c-Article.html Last accessed Jul. 14, 2004.

Spangenberg, K. M., Farr, M. M., Roy, A. K., Bonassar, L. J., Vacanti, C. A., and Cortiella, J. Tissue engineering of tracheal epithelium: a model of isolation, growth, and culture in pluronic F127NF. Tissue Eng. 4, 476, 1998.

Mikos, A. G., McIntire, L. V., Anderson, J. M., and Babensee, J. E. Host response to tissue engineered devices. Adv. Drug Deliv. Rev 33, 111, 1998.

Kojima, K., Bonassar, L. J., Roy, A. K., Vacanti, C. A., and Cortiella, J. Autologous tissue-engineered trachea with sheep nasal chondrocytes. J Thorac. Cardiovasc. Surg. 123, 1177, 2002.

Sheppard, M. N., Marangos, P. J., Bloom, S. R., and Polak, J. M. Neuron specific enolase: a marker for the early development of nerves and endocrine cells in the human lung. Life Sci. 34, 265, 1984.

Cao, Y., Vacanti, J. P., Paige, K. T., Upton, J., and Vacanti, C. A. Transplantation of chondrocytes utilizing a polymer-cell construct to produce tissue-engineered cartilage in the shape of a human ear. Plast. Reconstr. Surg. 100, 297, 1997.

Yang, S., Leong, K. F., Du, Z., and Chua, C. K. The design of scaffolds for use in tissue engineering. Part I. Traditional factors. Tissue Eng. 7, 679, 2001.

Park, K. I., Teng, Y. D., and Snyder, E. Y. The injured brain interacts reciprocally with neural stem cells supported by scaffolds to reconstitute lost tissue. Nat. Biotechnol. 20, 1111, 2002.

Bonassar, L. J. and Vacanti, C. A. Tissue engineering: the first decade and beyond. J. Cell Biochem. Suppl. 30-31, 297, 1998.

Bianco, P. and Robey, P. G. Stem cells in tissue engineering. Nature 414, 118, 2001.

All references cited herein are incorporated by reference. While this invention has been described fully and completely, it should be understood that, within the scope of the appended claims, the invention may be practiced otherwise than as specifically described. Although the invention has been disclosed with reference to its preferred embodiments, from reading this description those of skill in the art may appreciate changes and modification that may be made which do not depart from the scope and spirit of the invention as described above and claimed hereafter.

We claim:

1. A method comprising the steps of:
feeding a contaminated brine solution comprising a monovalent alkali metal salt and having a monovalent alkali metal salt salinity greater than or equal to about 3% to a biological reactor containing a mixed bacterial culture capable of degrading at least one contaminant under anoxic/anaerobic conditions;
adding an effective amount of a divalent cation precursor to the reactor, where the effective amount of the divalent precursor is sufficient to maintain a divalent to monovalent cation mole ratio at a numeric value greater than or equal to about 0.05 and to form a medium capable of supporting a stable population of the bacterial culture, and
degrading the contaminant in the contaminated brine solution for a time and at a temperature sufficient to reduce a concentration of the contaminant at or below a desired concentration while maintaining a suitable nutrient environment in the reactor and while maintaining the divalent to monovalent cation mole ratio greater than or equal to about 0.05.

2. The method of claim 1, wherein the reactor is sealed to reduce or eliminate oxygen from the reactor.

3. The method of claim 1, further comprising the step of:
sparging or purging the reactor with an oxygen-free gas after feeding the brine solution and optionally during the degrading step.

4. The method of claim 1, wherein the gas is selected from the group of nitrogen, argon, and mixtures and combinations thereof.

5. The method of claim 1, wherein the divalent cation precursor is selected from the group consisting of a soluble $Mg^{2+}$ salt, a soluble $Ca^{2+}$ salt, a soluble $Sr^{2+}$, a soluble $Ba^{2+}$ salt, and mixtures or combinations thereof.

6. The method of claim 1, wherein the divalent cation precursor is selected from the group consisting of a soluble $Mg^{2+}$ salt, a soluble $Ca^{2+}$ salt, a soluble $Sr^{2+}$, and mixtures or combinations thereof.

7. The method of claim 1, wherein the divalent cation precursor is selected from the group consisting of a soluble $Mg^{2+}$ salt, a soluble $Ca^{2+}$ salt, and mixtures or combinations thereof.

8. The method of claim 1, wherein the divalent cation precursor is a soluble $Mg^{2+}$ salt.

9. The method of claim 1, wherein the contaminant is selected from the group consisting of perchlorate, nitrate and mixture or combinations thereof.

10. The method of claim 9, wherein the nutrient environment comprises adding an inorganic energy source or an organic energy source in amounts greater than a stoichiometric amount of electrons required to reduce the perchlorate and/or nitrate present in the brine solution for sustained microbial growth during the degrading step.

11. The method of claim 10, wherein the inorganic energy source is selected from the group consisting of $H_2$ gas, a hydrogen delivery chemical, and mixtures or combinations thereof.

12. The method of claim 10, wherein the organic energy source is selected from the group consisting of acetate, ethanol, methanol, lactate, and mixtures or combinations thereof.

13. The method of claim 1, wherein the contaminated brine solution is a perchlorate and/or nitrate contaminated ion-exchange regenerate brine.

14. A method comprising the steps of:
passing a waste water stream including at least one ion-exchangeable pollutant through an ion-exchange resin able of exchanging the pollutant ion for a non-pollutant ion for a predetermined time or until the resin is no longer able to exchange the pollutant ion with the non-pollutant ion;

stopping the waste water stream from passing through the resin;

passing a brine solution comprising a monovalent alkali metal salt and having a monovalent alkali metal salt salinity greater than or equal to about 3% through the resin for a time sufficient to exchange all or substantially all of the pollutant ion with the non-pollutant ion to form a pollutant contaminated brine solution;

adding an effective amount of a divalent cation to the pollutant contaminated brine solution to adjust a divalent to monovalent cation mole ratio to a numeric value greater than or equal to 0.05 to form a stabilized, pollutant contaminated brine solution capable of supporting a stable population of a pollutant degrading bacterial culture;

contacting the stabilized, pollutant contaminated brine solution with an effective amount of the pollutant degrading bacterial culture under anaerobic/anoxic conditions for a time and at a temperature sufficient to degrade a concentration of the pollutant to or below a desired concentration to form a crude treated brine solution, while maintaining the divalent to monovalent cation mole ratio greater than or equal to about 0.05; and filtering the crude treated brine solution to remove the culture and to form a treated brine solution.

15. The method of claim 14, wherein the brine solution comprises the treated brine solution.

16. A method comprising the steps of:

feeding a waste water stream including at least one ion-exchangeable pollutant with a first column including a first ion-exchange resin able of exchanging the pollutant ion for a non-pollutant ion for a predetermined time or until the resin is no longer to exchange the pollutant ion with the non-pollutant ion;

switching the waste water stream feeding from the first column to a second column including a second ion-exchange resin capable of exchanging the pollutant ion for a non-pollutant ion for a predetermined time or until the resin is no longer to exchange the pollutant ion with the non-pollutant ion;

passing a brine solution comprising a monovalent alkali metal salt and having a monovalent alkali metal salt salinity greater than or equal to about 3% through the first column for a time sufficient to exchange all or substantially all of the pollutant ion with the non-pollutant ion to form a pollutant contaminated brine solution and to regenerate the first resin;

adding an effective amount of a divalent cation to the pollutant contaminated brine solution to adjust a divalent to monovalent cation mole ratio to a numeric value greater than or equal to 0.05 to form a stabilized, pollutant contaminated brine solution capable of supporting a stable population of a pollutant degrading bacterial culture;

contacting the stabilized, pollutant contaminated brine solution with an effective amount of the pollutant degrading bacterial culture under anaerobic/anoxic conditions for a time and at a temperature sufficient to degrade a concentration of the pollutant to or below a desired concentration to form a crude treated brine solution, while maintaining the divalent to monovalent cation mole ratio greater than or equal to about 0.05;

filtering the crude treated brine solution to remove the culture and to form a treated brine solution;

switching the waste water stream feeding from the second column to first column; and repeating the above-identified steps.

17. The method of claim 16, wherein the first and second ion-exchange resins are the same.

\* \* \* \* \*